Oct. 22, 1940.    L. G. MORTEN    2,218,545
ELECTRICITY CONDUCTOR UNIT
Filed Dec. 27, 1933    3 Sheets-Sheet 3
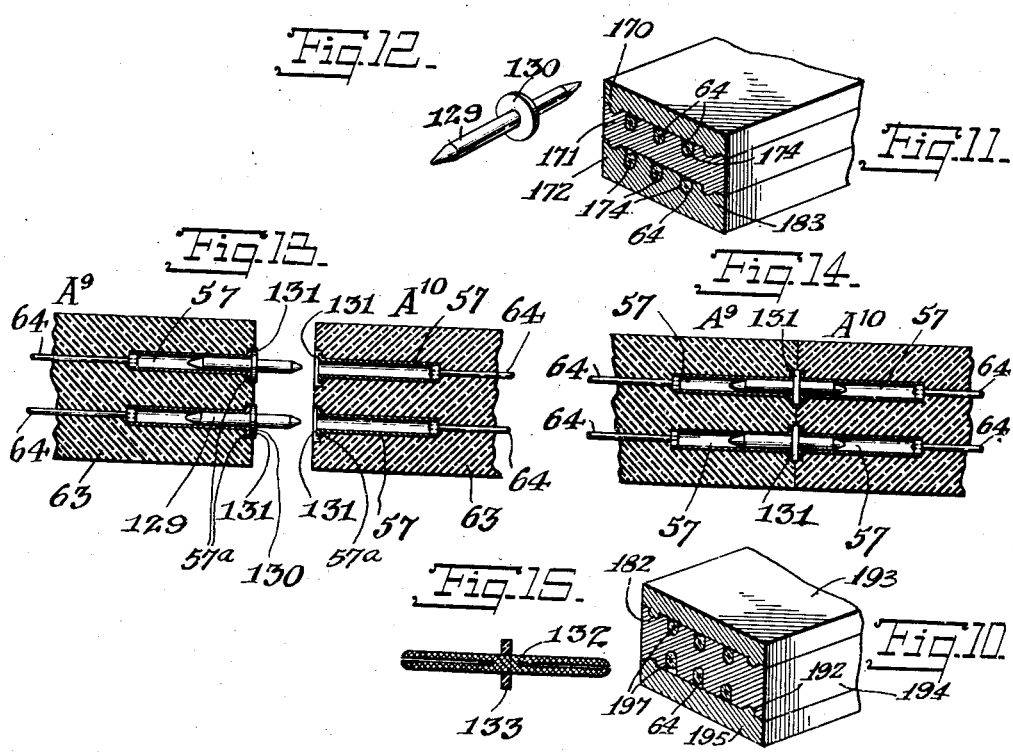

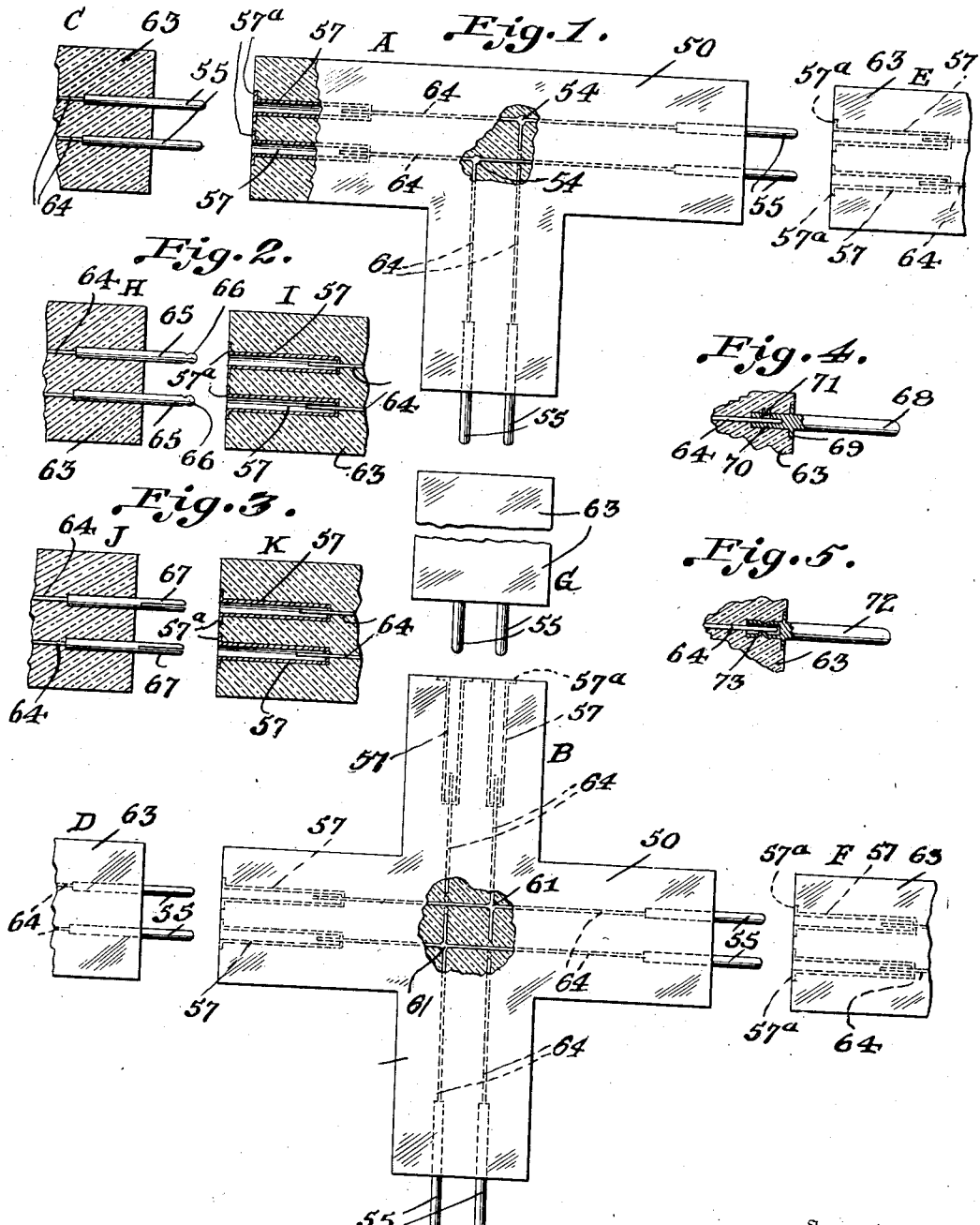

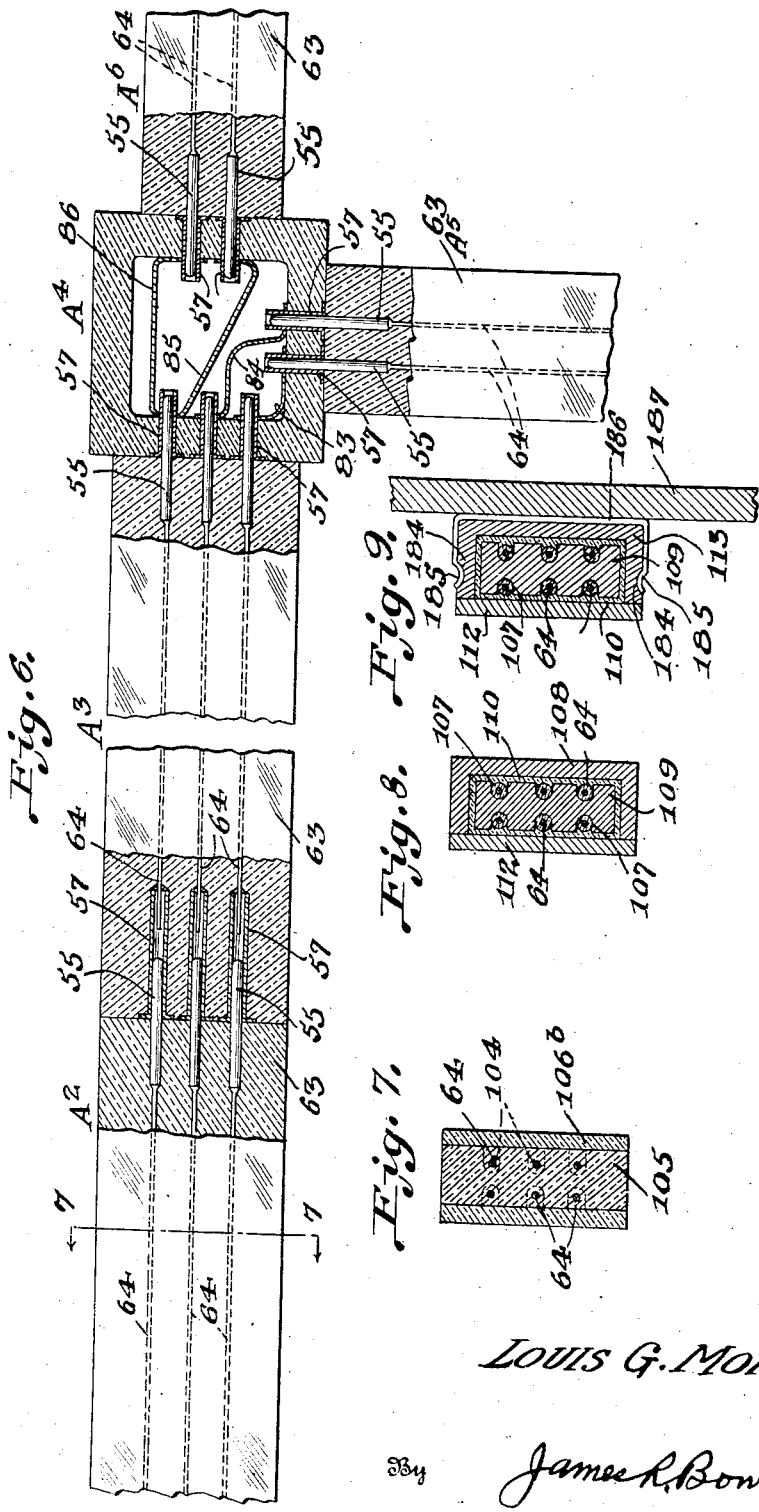

Patented Oct. 22, 1940

2,218,545

UNITED STATES PATENT OFFICE 2,218,545

ELECTRICITY CONDUCTOR UNIT

Louis G. Morten, Teaneck, N. J., assignor to John B. Pierce Foundation, New York, N. Y., a corporation of New York Application December 27, 1933, Serial No. 704,189

1 Claim. (Cl. 173—334.1)

This invention relates to electricity conductor units.

One object of the invention is to provide a unit adaptable to places, structures and the like and for use in multiple to facilitate the wiring of the structure or place for electric current without the exercise of special skill or education and without special trade knowledge.

Another object of the invention is to provide units having means over which electrical current may pass, which units may be manufactured at a factory, and a number of which units may be properly selected and installed where desired without special skill in the installation of electric wiring.

Another object of the invention is to provide a unit which may be of any desired size, configuration and/or length and which may contain any desired number of conductors.

The invention also provides a unit having any desired number of electricity conductors, and which is provided with suitable connections whereby conductors carried by the unit may be interconnected with desired or corresponding conductors of another unit or units merely by so assembling the units that certain conductors may extend substantially contiguously in an electric circuit throughout any desired number of units.

The invention also provides a unit having therein conductors over which any desired number of electric currents may pass, which currents may be of the same character or differ in nature, voltage, amperage and/or other characteristics.

Another object of the invention is to provide a unit having therein conductors adapted to form parts of different circuits, such as light and power circuits, telephone circuits, radio circuits, or circuits for any other purpose or purposes, including such purposes, as, for instance, local bell systems, burglar alarms, and the like, the unit being provided with means for maintaining conductors therein in spaced apart and insulated relation.

The invention has for a further object a unit which may have suitable outlets for taking off electric current at desired points.

A still further object of the invention is to provide means for connecting a setup group of units with a source of current supply.

A still further object of the invention is to provide means for preventing undesired interference with the flow of electric current over conductors contained in the unit.

Other objects and advantages of the invention will be apparent as the specification proceeds and will be more particularly pointed out in the claim appended hereto.

In the accompanying drawings illustrating embodiments of the invention, wherein like symbols refer to like or corresponding parts throughout the several views:

Figure 1 is a plan view of units and parts of units embodying my invention in related but separated positions;

Figure 2 is a fragmentary sectional view of ends of adjacent units embodying my invention;

Figure 3 is also a fragmentary sectional view of ends of adjacent units embodying my invention;

Figure 4 is a detailed fragmentary view illustrating a means for fastening two electricity conductors together;

Figure 5 is a detailed fragmentary view showing another means for fastening two electricity conductors together;

Figure 6 is a sectional view, partly broken away, of a unit embodying the invention and parts of other units embodying the invention coupled thereto;

Figure 7 is a transverse section taken on the line 7—7 of Figure 6;

Figure 8 is a transverse section of a unit embodying the invention;

Figure 9 is a transverse section of a unit embodying the invention showing a supporting means for a unit;

Figure 10 is a perspective view of a portion of a unit made in three parts;

Figure 11 is a perspective view of a portion of a unit also made in three parts;

Figure 12 is a perspective view of a connector pin;

Figure 13 is a sectional view of ends of two units in relative position but separated, connector pins being shown in an end of one of the units;

Figure 14 is a sectional view of the two ends illustrated in Figure 13, said ends being shown as joined;

Figure 15 is a perspective view of a bifurcated connector pin.

My invention relates to an electrical wiring system or extension thereof, constituted of sections mechanically and electrically connected in series with one another. The resulting connected sections may be used as a part of a baseboard, may be shaped to form part of a molding or like building trim, or may be used for general electrical extension purposes.

Figs. 1 through 5 illustrate generally my invention, the section A functioning as an end section, specifically of the configuration of a T, the section B having the configuration of a cross, the section G and duplicates thereof interconnecting the terminal portion of the section A with the terminal portion of the section B. In like manner, the sections C and E may be respectively electrically and mechanically connected with the adjacent ends of the bar of the T-shaped section A, and similarly the sections D and F may be connected to the abutting ends of the central bar portion of the cruciform section B.

The electrical conductors are insulatedly mounted in the respective sections A, B, C, D, E, F, and G, either by employing an electrical insulation material for the bodies of the stated sections or individually electrically insulating the conductors within the material of the bodies of these sections. A characteristic of the electrical conductors illustrated in Figs. 1 through 5, is that the conductors project, see 55, 55 as extensions at and beyond one end of each section, and that socketed terminals 57 are provided for the conductors within the respective sections, such socketed ends being spaced relative to one another and disposed within the material of the body of the sections corresponding to the mutual spacing of the projecting conductor ends 55, 55 and their disposition within the body of the adjacent section.

As is clearly shown in the drawings, the socketed terminals 57 are provided with flange portions 57a countersunk within the material forming the body of the respective conductor units. It will be obvious that the engagement of such flange portions with the body material serves to maintain the position of said terminals 57 against accidental displacement, thus insuring the accuracy of alignment of interconnected units and maintaining the visual effect of continuity of the assembled wiring system.

Such flanges may be flush with the faces of the units, see Fig. 1, or countersunk within the body portions of the units, as shown in Figs. 13 and 14.

In section A the electrical conductors are designated 64, 64, extending through the bar of the body 50 of the T-shaped section A; in the stem of the T shaped body of the section A, the conductors 64, 64 are connected to the foregoing conductors at the junction points 54, 54. The electrical conductors 64, 64 in the cruciform section B extending through the body 50 thereof and the electrical conductors 64, 64 extending through the stem of the cruciform section B are connected at the junction points 61.

The conductors 64, 64 in the sections C and D are electrically connected to their respective conductors ends 55, 55, whereas the conductors 64, 64 in the sections D, E, and F are connected to the socketed ends 57, 57.

In Fig. 2, the section H having electrical conductors 64, 64, are provided with extending electrical terminals 65, 65 of substantially cylindrical configuration, said terminals having rounded friction heads 66, 66 to be frictionally received within the socketed ends 57, 57 of the conductors 64, 64 of the thereto connected section I. In Fig. 3, the section J, having electrical conductors 64, 64 are provided with bifurcated electrical terminals 67, 67 to be frictionally received within the socketed ends 57, 57.

The conductors 64, 64 may be wires, rods, wires or rods having tubular, i. e., socketed ends, tubes or the like, of electrical conducting material of suitable capacity.

The preferred means of mounting the said conductors within the body portions 63 of the respective conductor units C, D, E, F, G, H, I, and J will hereinafter be described in detail.

Figures 4 and 5 illustrate specific means of interconnecting the conductors 64 with projecting connector elements. In Fig. 4, a connector 68 is provided with a collar or flange 69 countersunk into the body 63 of a conductor unit. A recessed tail piece 70 receives an end of the conductor 74, and said conductor may be secured therein by a set screw 71.

In Fig. 5, the tail piece 73 of connector 72 receives the conductor 64 and is crimped about said conductor to secure the same.

In the embodiments shown in Figs. 6 and 7, six electrical conductors are provided for in the respective sections A2, A3, A5, and A6. The conductors 64 of the section A2 have their projected electrical terminals 55 received within the socketed ends 57 of the corresponding conductors 64 of the section A3. The projecting electrical terminals 55 of the section A3 are shown connected to a connecting or terminal section A4.

The connecting or terminal section A4 as shown in Fig. 6 may be hollow and provided with a number of tubular socket or terminal conductors 57. In the illustration, section A4 serves as a connecting terminal for the conductors of the unit lengths A3, A5, and A6. Each of such units A3, A5, and A6 are provided with projecting terminal pins 55, for insertion into and frictional interconnection with the tubular terminals 57 of the terminal section A4. Suitable jumpers 83, 84, 85, 86, etc. interconnect the stated sections A3, A5, A6 in desired order.

The units A2, A3, A5, and A6 may have any desired number of conductors 64 with the appropriate pin connectors 55 and socketed conductors 57 therefor.

In Figure 7 there is illustrated a section of unit A2 and wherein a portion of the body 63 of the unit is designated 105 and has grooves 104 therein in which are placed the conductors 64. As shown, the grooves 104 are open at their top end and cover plates 106b are utilized as means for closing in or hermetically sealing in their conductors 64 against damage or accidental contact with persons or other objects.

Said cover plates 106b may be secured to the body 105 in any suitable manner, preferably by suitable cement or other adhesive, after the conductors 64 have been positioned within the respective grooves 104.

Desirably, the said body 105 is wholly of a suitable electrical insulation material such as molded plastic, hard or semi-hard rubber, or the like. The cover plates 106b are also desirably wholly of insulation material, and may be of such character as will afford structural strength and/or suitable decorative treatment.

The embodiment of Fig. 8 embodies the inventive concept of the laminated construction of Fig. 7. The Fig. 8 embodiment preferably comprises a core or body portion 109, of electrical insulation material, said body portion having any desired plurality of longitudinally arranged channels 107 for the reception of electrical conductors 64, said conductors thereby being maintained in insulated spaced relationship one with the other. The body 109 is provided with an envelope 110 and an outer shell, consisting of a base 108 and cover 112 secured thereto, completes the assembly. As illustrated, envelope 110 overlies the channels 107, and may be in contact with the conductor means 64; such envelope is, therefore, preferably of electrical insulation material. The base 108 and the cover means 112 therefore need not, in this embodiment, be of electrical insulation material, although the structural strength and the opportunities for decoration and esthetic effect afforded by the electrically insulating plastic materials renders such materials particularly advantageous for use. Said outer shell, therefore, may serve as a structural as well as ornamental element of said conductor unit.

Figure 9 illustrates means whereby an electrical conductor unit may be secured to a wall or baseboard of a building. In such embodiment, the base 108 may be provided with longitudinally arranged grooves 184 into which the beaded arm portions 185 of a spring clip 186 may be snapped. Such spring clip may be secured to a wall or baseboard 187 in any suitable manner, and the conductor unit inserted therein for support.

The electrical conductor unit shown in Fig. 10 embodies the laminated construction hereinbefore described, and preferably comprises a body 194 of electrical insulation material, on opposite faces of which are formed longitudinal channels 197 to accommodate the conductors 64. The facing and backing portions, 193 and 195 respectively, may each be formed with longitudinally extending beads 182, said beads cooperating with the illustrated grooves in the body 194 to secure the respective facing and backing portions 193 and 195 against lateral displacement, and also to serve an important function in precluding the access of a knife blade or other thin bladed device to the conductors.

Figure 11 represents a second embodiment of the structure described in Fig. 10. In Fig. 11, the body portion 171 receives the electrical conductor means 64 within suitable longitudinal grooves 174 formed in a face of said body portion. A cover member 170, desirably of electrical insulation material is arranged to overlie the said body portion 171 and is positioned with respect thereto by the illustrated bead and groove joint. The base portion 172 is likewise provided with a suitable number of longitudinal grooves 174, within which are positioned the conductors 64. Said base portion has grooves 183 at the edges thereof to accommodate a bead formed on the under side of the stated body portion 171. Such bead and groove relationship between the body portion and the cover and base portions insures positive alignment of the laminae of the electrical conductor unit and offers protection against short circuit or contact with the conductors 64 by reason of the insertion of a thin bladed tool into the unit at the side seams thereof.

In Figures 12 to 15, inclusive, there are illustrated means for effecting an electrical and mechanical interconnection between contiguous conductor carrying units embodying sockets 57 at the terminal ends thereof. As shown in Fig. 13, and as previously described, the conductor carrying units designated A⁹ and A¹⁰ incorporate electrical conductors 64 at the terminal ends of which are disposed socket members 57, said socket members being suitably secured to the conductors to afford electrical transmission therewith. A metallic pin connector 129, see Fig. 12, is of suitable external diameter to fit snugly within the sockets 57 for frictional electrical connection therewith. To limit the depth of insertion of the pin within the socket 57, there is desirably provided a centrally disposed flange 130. Said flange is desirably of electrical insulation material, and to accommodate said flange in a manner providing for an intimate face to face contact of units A⁹ and A¹⁰, see Fig. 14, the stated conductor units are provided with suitable recesses 131.

Figure 15 illustrates a second form of connector pin which may be employed with the stated conductor units. The body 132 of said pin is bifurcated, and is desirably of slightly larger diameter than the internal diameter of the sockets 57. Upon the insertion of the ends of the said pins into the said sockets, the resistance to distortion afforded by the material insures an intimate contact with the walls thereof.

Said pin 132 may be provided with an insertion-limiting flange 133, as hereinbefore described.

It is obvious that various changes and modifications may be made in the embodiments of the invention herein described and illustrated in the drawings without departing from the spirit thereof. The drawings and descriptions are submitted as illustrative and not in a limiting sense, the scope of the invention being defined in the following claim.

What is claimed is:

An electrical conductor unit adapted to be used as one of a plurality of units interconnected mechanically and electrically in seriatim, said electrical unit comprising a plurality of sets of conductors, each conductor having a length substantially the length of the unit, a body block provided with longitudinal grooves in opposite sides and with outwardly disposed edge grooves of less depth than said intermediate longitudinal grooves, said electrical conductors being insulatedly mounted within said longitudinal grooves and extending longitudinally of said body block from end face to end face thereof, said conductors at an end face of said block having socket means to receive electrical conductor means of an adjacent unit and having a peripheral flange countersunk into the said end face of said body block, and cap plate means disposed against said body block on said opposite sides thereof and having flat faces for engaging across and closing said longitudinal grooves intermediate said outwardly disposed edge grooves to secure the conductors therein, said cap plate means being provided with anchoring beads for engagement with said outwardly disposed grooves of the body block for holding said cap plate means in position thereagainst.

LOUIS G. MORTEN.